US008594498B2

(12) United States Patent
Cahill

(10) Patent No.: US 8,594,498 B2
(45) Date of Patent: Nov. 26, 2013

(54) METHOD AND APPARATUS FOR IN-BAND OSNR MONITORING

(75) Inventor: Michael Cahill, Dedham, MA (US)

(73) Assignee: Photop Aegis, Inc., Woburn, MA (US)

( * ) Notice: Subject to any disclaimer, the term of this patent is extended or adjusted under 35 U.S.C. 154(b) by 963 days.

(21) Appl. No.: 12/236,495

(22) Filed: Sep. 23, 2008

(65) Prior Publication Data

US 2009/0080882 A1    Mar. 26, 2009

Related U.S. Application Data

(60) Provisional application No. 60/974,675, filed on Sep. 24, 2007.

(51) Int. Cl.
*H04B 10/08* (2011.01)
(52) U.S. Cl.
USPC ............................................... 398/26; 398/34
(58) Field of Classification Search
USPC ..................................................... 398/26, 34
See application file for complete search history.

(56) References Cited

U.S. PATENT DOCUMENTS

| | | | |
|---|---|---|---|
| 6,670,599 B2 | 12/2003 | Wagner et al. | |
| 6,879,014 B2 | 4/2005 | Wagner et al. | |
| 7,002,697 B2 | 2/2006 | Domash et al. | |
| 7,049,004 B2 | 5/2006 | Domash et al. | |
| 7,221,827 B2 | 5/2007 | Domash et al. | |
| 7,304,799 B2 | 12/2007 | Ma et al. | |
| 7,440,170 B2 * | 10/2008 | Kao et al. | 359/337.2 |
| 2004/0173731 A1 * | 9/2004 | Beger et al. | 250/226 |
| 2004/0234198 A1 | 11/2004 | Wagner et al. | |
| 2005/0031341 A1 * | 2/2005 | Stuart | 398/26 |
| 2005/0105184 A1 | 5/2005 | Ma et al. | |
| 2007/0136014 A1 * | 6/2007 | Neiss | 702/76 |
| 2007/0196110 A1 * | 8/2007 | Mikkelsen et al. | 398/140 |
| 2007/0264010 A1 | 11/2007 | Bartolini | |
| 2008/0205887 A1 | 8/2008 | Murano et al. | |

OTHER PUBLICATIONS

Cahill, Michael, et al., Tunable Thin Film Filters for Intelligent WDM Networks, Advances in Thin Film Coatings for Optical Applications III, Aug. 2006, Society of Photo-Optical Instrumentation Engineers.
Miniature 50 GHz Tunable Optical Detector, Aegis Lightwave, Woburn, MA USA.

* cited by examiner

*Primary Examiner* — Dawayne A Pinkney
(74) *Attorney, Agent, or Firm* — Kurt Rauschenbach; Rauschenbach Patent Law Group, LLC

(57) ABSTRACT

An optical signal-to-noise ratio monitor includes a demodulator comprising an input that receives at least a portion of a phase modulated optical signal. The monitor also includes a delay interferometer with a periodic phase control that sweeps a differential delay of one arm of the interferometer through a plurality of differential optical phase shifts. The demodulator converts phase modulated optical signals to intensity modulated optical signals. A tunable optical filter continuously scans a transmission wavelength over a desired wavelength range in a time that allows more than one wavelength to be transmitted through an output of the tunable filter for each of the plurality of differential optical phase shifts. An optical detector detects the filtered optical signal and generates a corresponding electrical demodulation signal at an output. A processor determines an optical signal-to-noise ratio for the more than one wavelength of the optical signal.

20 Claims, 5 Drawing Sheets

METHOD AND APPARATUS FOR IN-BAND OSNR MONITORING

RELATED APPLICATION SECTION

This application is a non-provisional patent application that claims priority to U.S. Provisional Patent Application Ser. No. 60/974,675, filed Sep. 24, 2007, entitled "Method and Apparatus for In-Band OSNR Monitoring." The entire specification of U.S. Provisional Patent Application Ser. No. 60/974,675 is incorporated herein by reference.

The section headings used herein are for organizational purposes only and should not be construed as limiting the subject matter described in the present application.

BACKGROUND OF THE INVENTION

Optical fiber communication systems are now widely deployed. Recently, relatively new communication services, such as the Internet, high-speed data links, video services, wireless services and CATV, have resulted in a dramatic increase in the need for higher information data rates. The aggregate data throughput rate of a communication system is typically increased by increasing at least one of the bandwidth of the individual data channels and the number of data channels.

State-of-the art optical fiber communication systems are being built to transmit data over long distances with higher data rates and/or with a larger number of data channels. In addition, state-of-the art optical fiber communication systems often include features, such as gain management, wavelength multiplexing, tunability, and switching. Furthermore, state-of-the art optical communications systems are agile, flexible, and reconfigurable. Many features of these state-of-the art networks are automated.

These state-of-the art optical communications systems typically require monitoring throughout the system. In these state-of-the-art systems, it is typically necessary to measure the optical power and the optical signal-to-noise ratio (OSNR) of WDM signals. It is also desirable to measure the power of the optical noise at the same wavelength as the signal, which is sometimes called the "in-band" optical signal-to-noise ratio.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed description about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present teachings will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teachings herein will recognize additional implementations, modifications, and embodiments, as well as other fields of use, which are within the scope of the present disclosure as described herein.

The present invention relates to methods and apparatus for determining the in-band optical signal-to-noise ratio in an optical communications system. In state-of-the art optical communications systems, wavelength division multiplexing channels can be individually added and dropped at any location. Conventional optical spectral measurements apparatus for OSNR monitoring can not be used because the OSNR has to be monitored within each channel band.

There are several known methods for monitoring in-band OSNR. Some methods for monitoring in-band OSNR use polarization nulling. However, these methods are unreliable in the presence of polarization mode dispersion and partially polarized noise. Other methods for monitoring in-band OSNR are based on orthogonal polarization heterodyne mixing of two spectral components of the signal. However these methods assume that the noise is completely depolarized, which is typically not an accurate assumption. Yet other methods for monitoring in-band OSNR use signal coherence to determine in-band OSNR.

Figure 1:
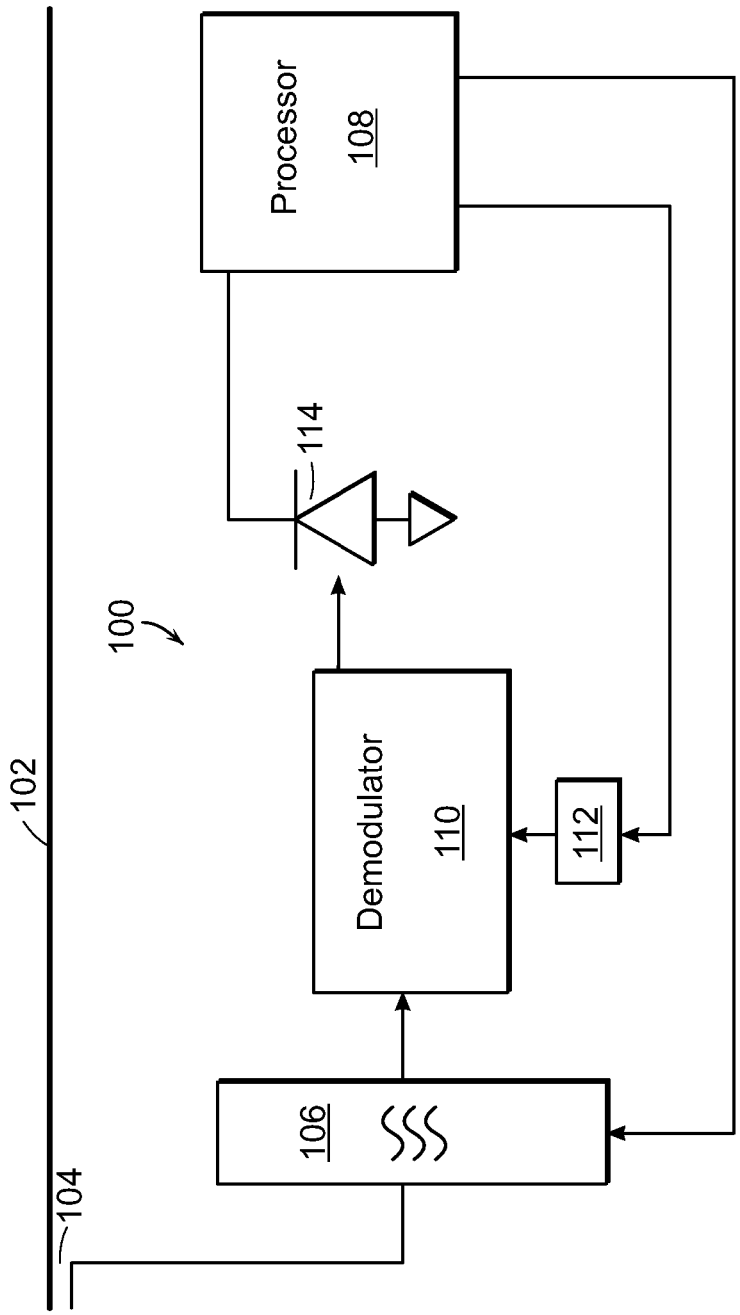
FIG. 1 illustrates a block diagram of a known in-band optical signal-to-noise ratio monitor that uses a signal coherence method.

FIG. 1 illustrates a block diagram of a known in-band optical signal-to-noise ratio (OSNR) monitor 100 that uses a signal coherence method. An optical link 102 propagates broadband optical signals. An input of the optical tap 104 is optically coupled to the optical link 102. The optical tap 104 directs a portion of the broadband optical signal propagating through the optical link 102 to the input of the in-band OSNR monitor 100.

The input of the in-band OSNR monitor 100 includes a set-and-hold tunable optical filter 106. The set-and-hold tunable optical filter 106 is an electrically controllable filter that is tuned to particular wavelengths for predetermined times. A processor 108 is electrically connected to a control input of the set-and-hold tunable optical filter 106. The processor 108 generates an electrical signal that tunes the set-and-hold tunable optical filter 106 to the desired wavelength band. The set-and-hold tunable optical filter 106 passes only the desired wavelength band of the optical signal at the output.

A demodulator 110 is position to receive the optical signal filtered by the set-and-hold tunable optical filter 106 at an input. The demodulator 110 includes a delay interferometer with periodic phase control. A temperature-controlled phase shifter, such as a temperature-controlled waveguide section in one arm of the delay interferometer, is used to form the delay. A temperature controller 112 is used to change the temperature of the temperature-controlled waveguide section in one arm of the delay interferometer. An output of the processor 108 is electrically connected to the temperature controller 112. The processor 108 instructs the temperature controller 112 to change the temperature of the temperature-controlled waveguide section in order to change the phase shift applied to one arm of the demodulator's delay interferometer.

A detector 114 is optically coupled to an output of the demodulator 110. The detector 114 is used to measure the output power of the demodulator 110 over time as the differential phase of the demodulator is adjusted by changing the temperature of the temperature-controlled waveguide. The phase is adjusted in order to obtain maximum power (constructive interference) and minimum power (destructive interference) at the demodulator output. The processor 108 determines the in-band OSNR from the signal generated by the output of the demodulator 110 by first determining the ratio between the maximum and minimum detected power from the delay interferometer as the phase delay scans over 180 degrees, and then comparing the ratio to the baseline created by the optical noise. The optical noise does not contribute to the interference pattern measured by the detector.

Figure 2:
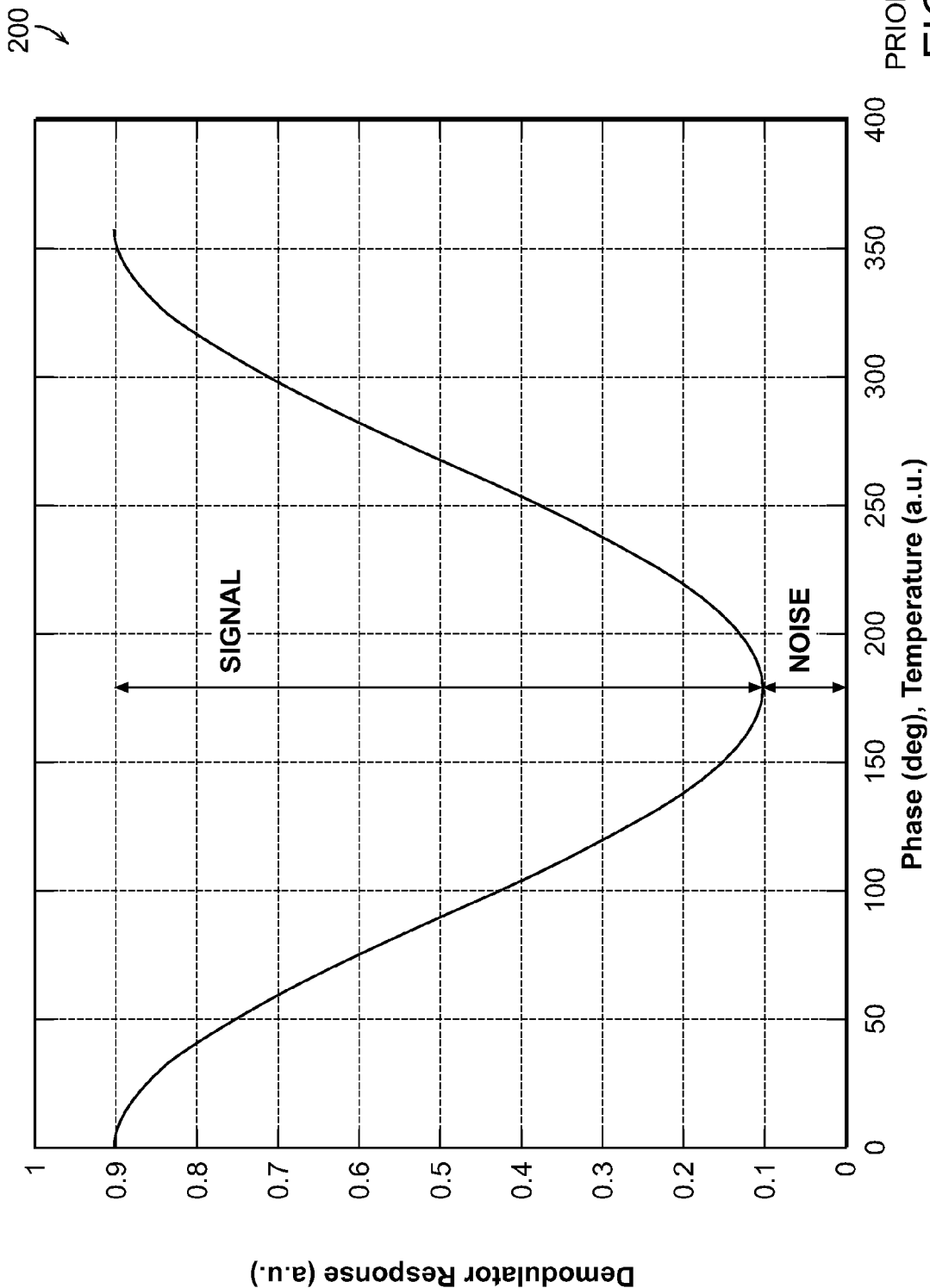
FIG. 2 illustrates a theoretical plot of an optical demodulator response (in arbitrary units) as a function of phase or temperature (in arbitrary units) for the known OSNR monitor that was described in connection with FIG. 1.

FIG. 2 illustrates a theoretical plot 200 of an optical demodulator response (in arbitrary units) as a function of phase or temperature (in arbitrary units) for the known OSNR monitor 100 that was described in connection with FIG. 1. Phase and temperature are typically equivalent in these devices. The plot 200 shows the expected change in the output of the demodulator that corresponds to constructive and destructive interference. The optical noise is related to the offset between a zero response at the minimum signal level. The demodulation response is used to determine the in-band OSNR.

The known state-of-the-art in-band OSNR monitors take measurements on each WDM signal in a sequential manner. Each of the measurements is performed in a time that is on order of about 10 seconds. This time interval is limited by the thermal response of the temperature-controlled demodulator section. Therefore, the total in-band OSNR measurement can take a relatively long time for real time monitoring measurements of an optical communications system. For example, measuring in-band OSNR of an 80 channel system using this technique takes approximately 14 minutes with state-of-the art components.

Figure 3:
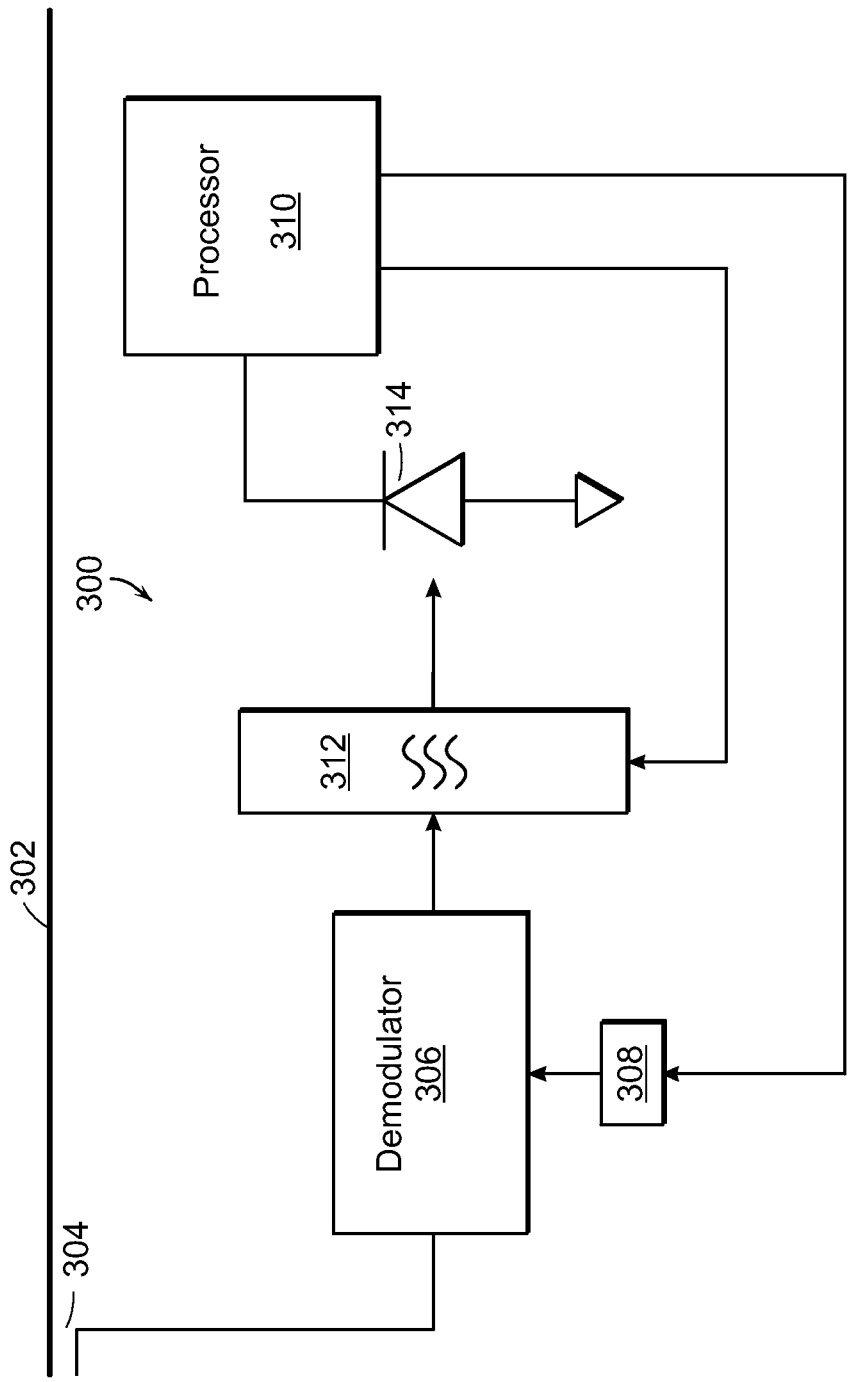
FIG. 3 illustrates a block diagram of an in-band optical signal-to-noise ratio (OSNR) monitor for measuring the in-band optical signal-to-noise ratio according to the present invention.

FIG. 3 illustrates a block diagram of an in-band optical signal-to-noise ratio (OSNR) monitor 300 for measuring the in-band optical signal-to-noise ratio according to the present invention. The in-band OSNR monitor 300 is shown coupled to an optical link 302 that propagates the broadband optical signal. An optical tap 304 is optically coupled to the optical link 302 to extract a portion of the broadband optical signal. The optical tap 304 directs a portion of the broadband optical signal propagating through the optical link 302 to the input of the demodulator 306.

In the embodiment shown, the demodulator 306 is a phase demodulator that demodulates the optical signals by converting the differential phase information into an intensity waveform. Many optical communications systems use phase modulated signals. For example, some optical communications systems use Differential-Phase Shift Keying (DPSK) modulation. In phase modulated systems, the digital information is written in the optical phase of the signal and, therefore, the digital information cannot be detected by ordinary intensity detectors. Consequently, receivers in these optical communications systems typically include optical demodulators, which convert the phase modulated signal to an intensity modulated signal. The resulting intensity modulated signal can then be detected by ordinary optical power detectors.

The demodulator 306 includes a delay interferometer with a periodic phase control that sweeps the phase in one arm of the delay interferometer. Such delay interferometers are known in the art. The delay interferometer splits the input optical signal into two signals. One signal is delayed relative to the other signal by a differential delay Δt, where the differential delay is less than the coherence time of the modulated signal, but is greater than the coherence time of the optical amplified spontaneous emission (ASE). The two signals are then recombined to achieve constructive or destructive interference depending on the phase difference between the arms of the demodulator 306.

In one embodiment, the demodulator 306 includes a temperature-controlled phase shifter, which can be a temperature-controlled waveguide section in one arm of the delay interferometer. A temperature controller 308 is used to change the temperature of the temperature-controlled waveguide section. Changing the temperature of the temperature-controlled phase shifter changes the differential optical phase shift applied to one arm of the demodulator's delay interferometer relative to the other arm of the demodulator's delay interferometer.

In one embodiment, a processor 310 controls the operation of the monitor 300 and determines the optical signal-to-noise ratio from the demodulated data. An output of the processor 310 is electrically connected to a control input of the temperature controller 308. The processor 310 generates a control signal that changes the temperature of the temperature-controlled waveguide section, and, therefore, the differential optical phase shift applied to one arm of the demodulator's delay interferometer relative to the other arm of the demodulator's delay interferometer.

In one embodiment, the processor 310 generates a plurality of control signals that periodically change the temperature of the temperature-controlled waveguide section a plurality of times. The periodic change in the temperature of the temperature-controlled waveguide section periodically changes the differential optical phase shift applied to one arm of the demodulator's delay interferometer relative to the other arm of the demodulator's delay interferometer a plurality of times.

An output of the optical demodulator 306 is optically coupled to an input of a continuously tunable optical filter 312. In one embodiment, the optical demodulator 306 and the tunable optical filter 312 are integrated into a single package. The continuously tunable optical filter 312 is a relatively fast response tunable filter that can continuously scans the passband of the entire WDM spectrum. For example, the continuously tunable filter can continuously tune over relatively short time intervals that are on order of milliseconds.

In particular, the time that the tunable optical filter 312 takes to scan the entire WDM spectrum is a relatively short time interval compared with time intervals of set-and-hold tunable filters. In one embodiment, the time that the optical filter 312 takes to scan across the entire WDM spectrum is less than the time between changes in the differential optical phase shift that are applied to one arm of the demodulator's delay interferometer relative to the other arm of the demodulator's delay interferometer. In one specific embodiment, the continuously tunable optical filter 312 is a thermally tunable filter, such as the thermally tunable filters manufactured by Aegis Lightwave, Inc, the assignee of the present invention.

An output of the processor 310 is electrically connected to a control input of the tunable optical filter 312. The processor 310 generates a control signal that instructs the tunable optical filter 312 to continuously tune the optical filter 312 through the desired spectrum. The processor 310 generates a control signal for the optical filter 312 that initiates the scan across the entire WDM spectrum that is synchronized to the control signal for the temperature controller 308. Therefore, for each differential optical phase shift applied to one arm of the demodulator's delay interferometer, the optical filter 312 can scan across the entire WDM spectrum, thereby taking measurements for each of the wavelengths in the desired WDM spectrum.

The use of the continuously tunable optical filter 312 in the in-band OSNR monitor 300 enables the in-band OSNR monitor to perform simultaneous in-band OSNR measurements for all the WDM channels. Performing simultaneous measurements for all WDM channels is highly desirable because the total measurement time can then be the same as the measurement time of a single WDM channel using known methods with a set-and-hold tunable filter. Therefore, the total measurement time of the entire WDM spectrum is greatly reduced with the in-band OSNR monitor of the present invention.

An optical detector 314, such as a photodiode, is positioned with an input in optical communication with the output of the optical filter 312. The optical detector 314 detects the filtered optical signal and then generates an electrical signal that corresponds to the detected optical signal. The output of the optical detector 314 is electrically connected to the processor 310.

In operation, optical signal-to-noise ratio measurements are taken with the OSNR monitor 300 by first directing a portion of the broadband optical signal propagating through the optical link 302 to the input of the demodulator 306 with the optical tap 304. The processor 310 then generates a signal that instructs the temperature controller 308 to change the temperature of the temperature-controlled waveguide section in one arm of the demodulator's delay interferometer so that the desired differential optical delay is generated. The signals in the two arms of the delay interferometer are then recombined to achieve constructive or destructive interference depending on the differential phase shift imparted by the temperature-controlled waveguide section of the demodulator 306.

The processor 310 also generates a signal that instructs the tunable optical filter 312 to continuously change the transmission wavelength of the tunable filter 312 over a desired wavelength range for the differential optical delay. In one embodiment, the desired wavelength range is the entire WDM spectrum. The detector 314 detects the signals recombined by the delay interferometer and then converts the recombined optical signals to electrical signals corresponding to each of the plurality of wavelengths passed by the tunable optical filter 312. The processor 310 receives the electrical signals generated by the detector 314 and then processes the signals to determine the optical signal-to-noise ratio and stores the electrical signal for use by a network management system.

The processor 310 then generates a signal that instructs the temperature controller 308 to change the temperature of the waveguide section in one arm of the demodulator's delay interferometer so that a new desired differential optical delay is generated. The processor 310 also generates a signal that instructs the tunable optical filter 312 to continuously change the wavelength of the tunable optical filter 312 to transmit the plurality of wavelengths at the new differential optical delay. The detector 314 then detects the filtered optical signals and generates electrical signals for the plurality of wavelengths passed by the tunable optical filter 312. The processor 310 receives the electrical signal generated by the detector 314 and then processes and stores the electrical signal for use by a network management system.

This OSNR measurement process is repeated a plurality of times as the differential phase delay in the demodulator is scanned over 180 degrees. Thus, for each differential optical phase that is chosen by the processor 310, the tunable optical filter 312 records a snap-shot of the interference pattern for all channels present in the WDM spectrum. The sampled interference pattern that is recorded for each WDM signal is then interpolated using sinusoidal curve fitting to determine the maximum and minimum power levels. The ratio between the maximum and minimum detected power from the delay interferometer is then compared to the baseline in order to determine the in-band OSNR for each channel.

Figure 4:
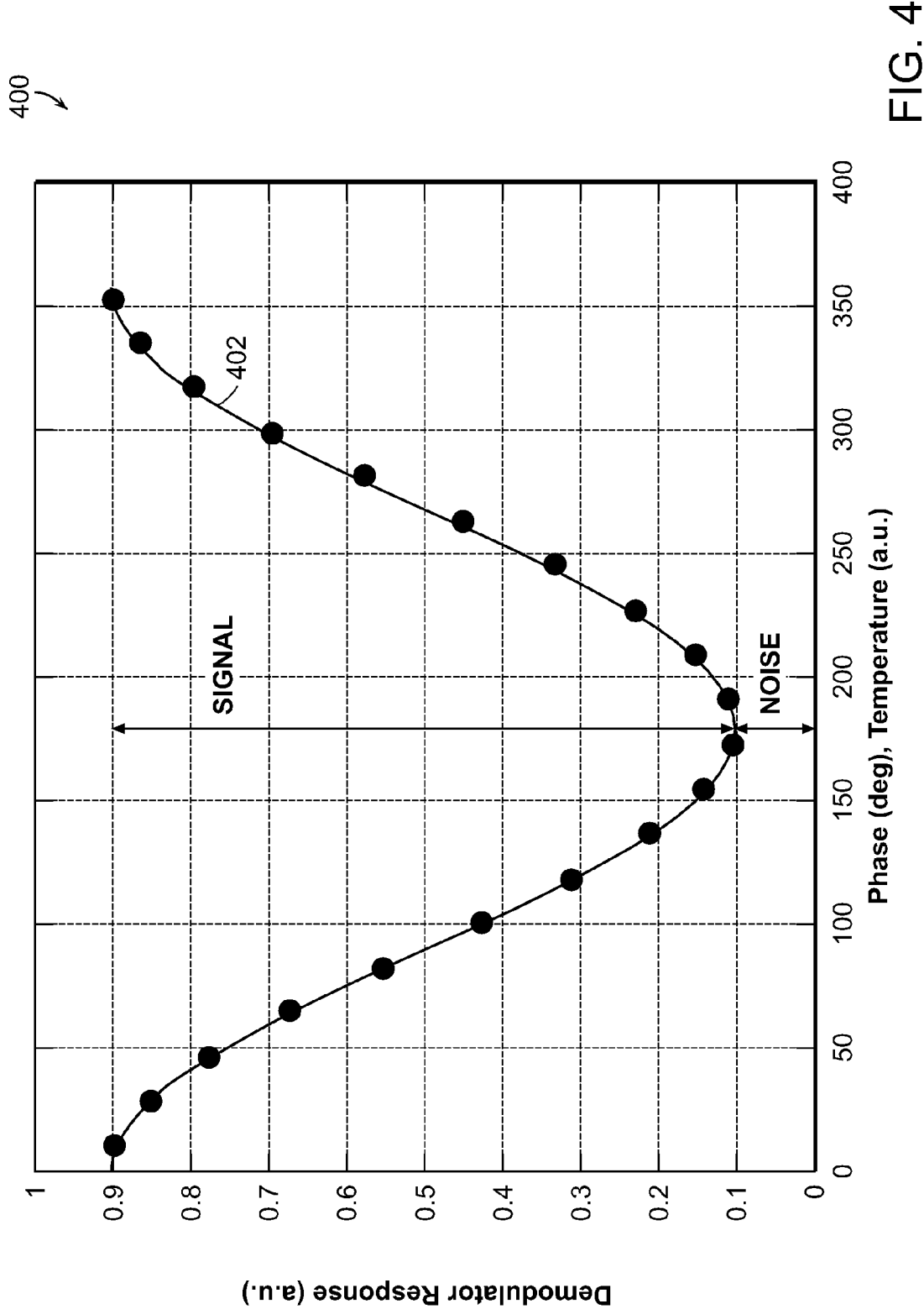
FIG. 4 illustrates a plot of calculated data for a sampled signal generated by the demodulator described in connection with FIG. 3 as a function of phase or temperature that determines the in-band OSNR.

FIG. 4 illustrates a plot 400 of calculated data for a sampled signal 402 generated by the demodulator 306 described in connection with FIG. 3 as a function of phase or temperature that determines the in-band OSNR. The plot 400 of the demodulator output signal 402 shows the expected change in the demodulator output that corresponds to the constructive and destructive interference that occurs in the delay interferometer in the demodulator 306 as the signal is sampled with different differential delays during filter scans. The sampled signal spectrum is then interpolated and the maximum and minimum values are used to determine the level of signal power present at the detector. The signal-to-noise ratio can be determined from the signal offset between a zero response at the minimum signal level of the intensity modulated optical signal. The optical-signal-to-noise ratio is then determined from the plot 400.

Figure 5:
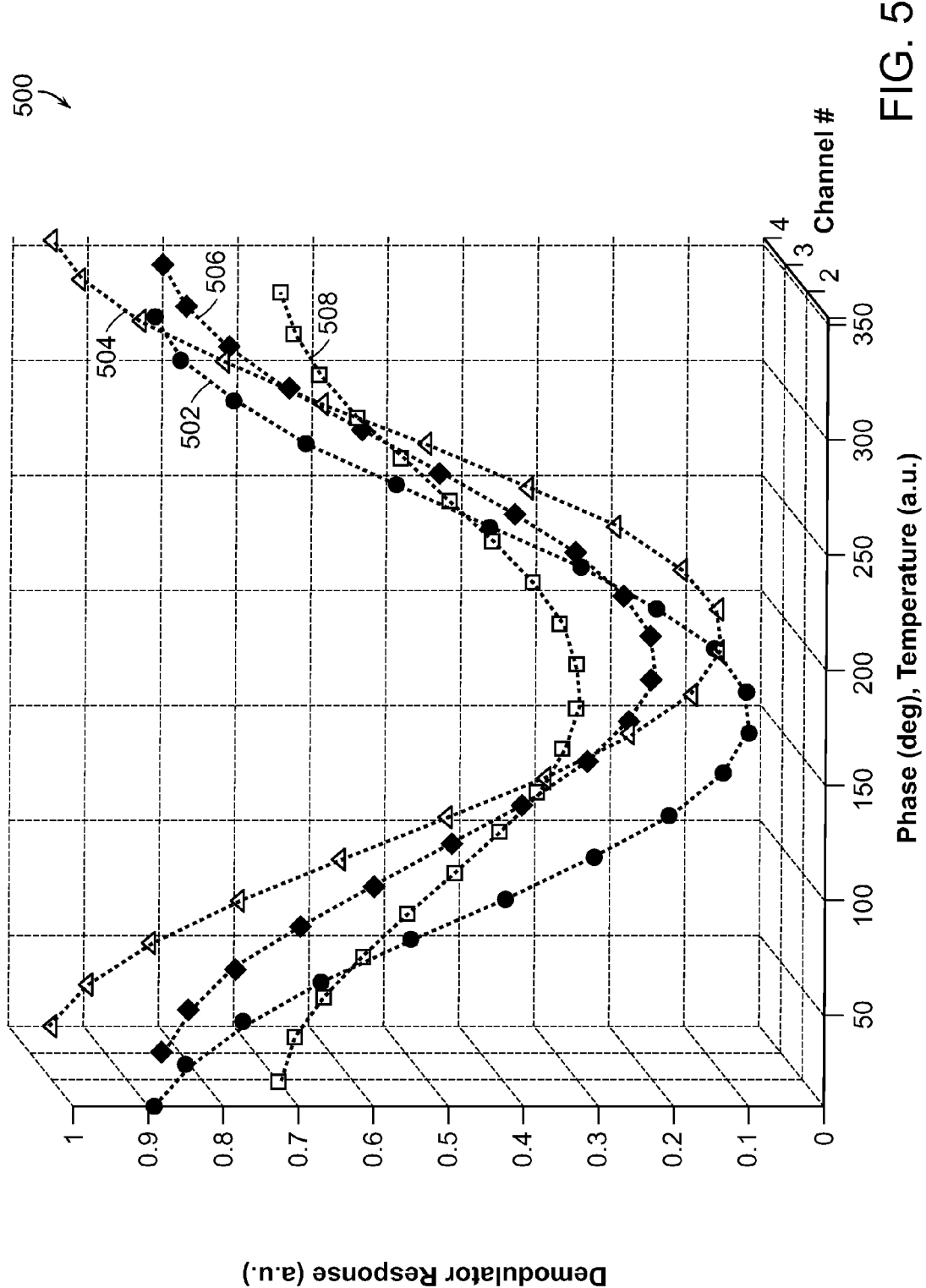
FIG. 5 illustrates a plot of calculated data for sampled signals of a four-channel WDM spectrum generated by the demodulator described in connection with FIG. 3 as a function of phase or temperature that determine the in-band OSNR.

FIG. 5 illustrates a plot 500 of calculated data for sampled signals of a four-channel WDM spectrum generated by the demodulator 306 described in connection with FIG. 3 as a function of phase or temperature that determine the in-band OSNR. The plot 500 shows the signals 502, 504, 506 and 508, which represent the four-channels of the WDM spectrum. The expected change in the demodulator output corresponds to the constructive and destructive interference that occurs in the delay interferometer of the demodulator as the four signals are sampled with different delays during filter scans. The sampled signal spectrum is then interpolated and the maximum and minimum values are used to determine the level of signal power present at the detector. The signal-to-noise ratio can be determined from the signal offset between a zero response at the minimum signal level of the intensity modulated optical signal. The calculated data for sampled signals of the four-channel WDM spectrum indicate that there are different contributions of the signals and of amplified stimulated emissions for each of the channels. The optical-signal-to-noise ratio is can be determined for each of the four-channels in the WDM spectrum from the plot 500.

The methods and apparatus for determining in-band OSNR according to the present invention are desirable because they are very fast compared with known methods and apparatus. In addition, the methods and apparatus of determining in-band OSNR according to the present invention are relatively independent of polarization mode dispersion, chromatic dispersion, and the degree of noise polarization.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, which may be made therein without departing from the spirit and scope of the invention.

What is claimed is:

1. An optical signal-to-noise ratio monitor comprising:
   a. a demodulator comprising an input that receives an input signal comprising at least a portion of a phase modulated optical signal and a delay interferometer that splits the input signal into two signals where one signal is delayed relative to the other signal by a differential delay, the delay interferometer having a periodic phase control that sweeps the differential delay of one arm of the interferometer through a plurality of differential optical phase shifts, the demodulator converting phase modulated optical signals to intensity modulated optical signals;
   b. a tunable optical filter that is optically coupled to the output of the demodulator, the tunable optical filter continuously scanning a transmission wavelength over a desired wavelength range in a time that allows more than one wavelength to be transmitted through an output of the tunable filter for each of the plurality of differential optical phase shifts;
   c. an optical detector having an input that is positioned at an output of the tunable optical filter, the optical detector detecting the filtered optical signal and generating a corresponding electrical demodulation signal at an output; and
   d. a processor having an input that is electrically coupled to output of the optical detector, the processor determining an optical signal-to-noise ratio for the more than one wavelength of the optical signal.

2. The optical signal-to-noise ratio monitor of claim 1 wherein the demodulator comprises a temperature-controlled phase shifter.

3. The optical signal-to-noise ratio monitor of claim 1 wherein the differential delay of the delay interferometer is less than a coherence time of the modulated signal, but is that greater than the coherence time of the optical amplified spontaneous emission in the phase modulated signal.

4. The optical signal-to-noise ratio monitor of claim 3 wherein an output of the processor is electrically connected to a control input of the temperature controller, the processor generating a signal that causes the temperature controller to change a temperature of the temperature-controlled phase shifter.

5. The optical signal-to-noise ratio monitor of claim 1 wherein the filter and demodulator are integrated into a single package.

6. The optical signal-to-noise ratio monitor of claim 1 wherein the tunable optical filter continuously scans a transmission wavelength over the desired wavelength range in a time that allows all wavelength in a WDM spectrum to be transmitted through an output of the tunable filter for at least some of the plurality of differential optical phase shifts.

7. The optical signal-to-noise ratio monitor of claim 1 wherein the processor further comprises a first output that is electrically connected to a control input of the demodulator and a second output that is electrically connected to a control input of the tunable optical filter, the processor generating a first control signal at the first output that controls the differential optical phase shifts in the demodulator and generating a second control signal at the second output that controls the scanning of the transmission wavelength over the desired wavelength range.

8. The optical signal-to-noise ratio monitor of claim 1 wherein the plurality of differential optical phase shifts combine to be about 180 degrees.

9. A method of measuring optical signal-to-noise ratios of an optical signal propagating in an optical link, the method comprising:
   a. sampling a portion of a phase modulated optical signal propagating through the optical link;
   b. demodulating the phase modulated optical signal with a delay interferometer that splits the phase modulated optical signal into two signals where one signal is delayed relative to the other signal by a differential delay and that sweeps the differential delay of one arm of the interferometer through a plurality of differential optical phase shifts, thereby converting the phase modulated optical signals to intensity modulated optical signals;
   c. filtering more than one wavelength in the intensity modulated optical signals for each of the plurality of differential optical phase shifts;
   d. detecting the filtered wavelengths in the intensity modulated optical signal; and
   e. determining a signal-to-noise ratio of the optical signal propagating in an optical link from the detected filtered wavelengths in the intensity modulated optical signal.

10. The method of claim 9 wherein the filtering the more than one wavelength in the demodulated optical signal for each of the plurality of differential optical phase shifts comprises filtering all wavelengths in a WDM spectrum.

11. The method of claim 9 wherein the filtering the more than one wavelength in the demodulated optical signal for each of the plurality of differential optical phase shifts comprises filtering a portion of a WDM spectrum.

12. The method of claim 9 further comprising selecting a differential delay of the delay interferometer that is less than a coherence time of the phase modulated signal, but that is greater than the coherence time of the optical amplified spontaneous emission in the phase modulated optical signal.

13. The method of claim 9 further comprising generating a control signal that changes the differential delay in the demodulator.

14. The method of claim 9 further comprising generating a control signal that initiates the scanning of the transmission wavelength over the desired wavelength range.

15. The method of claim 9 further comprising synchronizing the scanning of the transmission wavelength over the desired wavelength range to a change in the differential delay in the demodulator.

16. The method of claim 9 wherein the signal-to-noise ratio is determined from a signal offset between a zero response at the minimum signal level of the intensity modulated optical signal.

17. The method of claim 9 wherein the signal-to-noise ratio is determined from a ratio between a maximum and minimum detected power compared to a baseline.

18. The method of claim 9 wherein the demodulating the phase modulated optical signal comprises periodically changing a temperature of a temperature-controlled waveguide section a plurality of times.

19. The method of claim 9 wherein the plurality of differential optical phase shifts combine to be about 180 degrees.

20. An optical signal-to-noise ratio monitor comprising:
   a. a means for demodulating a phase modulated optical signal with a delay interferometer that splits the phase modulated optical signal into two signals where one signal is delayed relative to the other signal by a differential delay and that sweeps a differential delay of one arm of the interferometer through a plurality of differential optical phase shifts, thereby converting the phase modulated optical signals to intensity modulated optical signals;
   b. a means for filtering more than one wavelength in the intensity modulated optical signals for each of the plurality of differential optical phase shifts;
   c. a means for detecting the filtered wavelengths in the intensity modulated optical signal; and
   d. a means for determining a signal-to-noise ratio of the phase modulated optical signal from the detected filtered wavelengths in the intensity modulated optical signal.

* * * * *